UNITED STATES PATENT OFFICE.

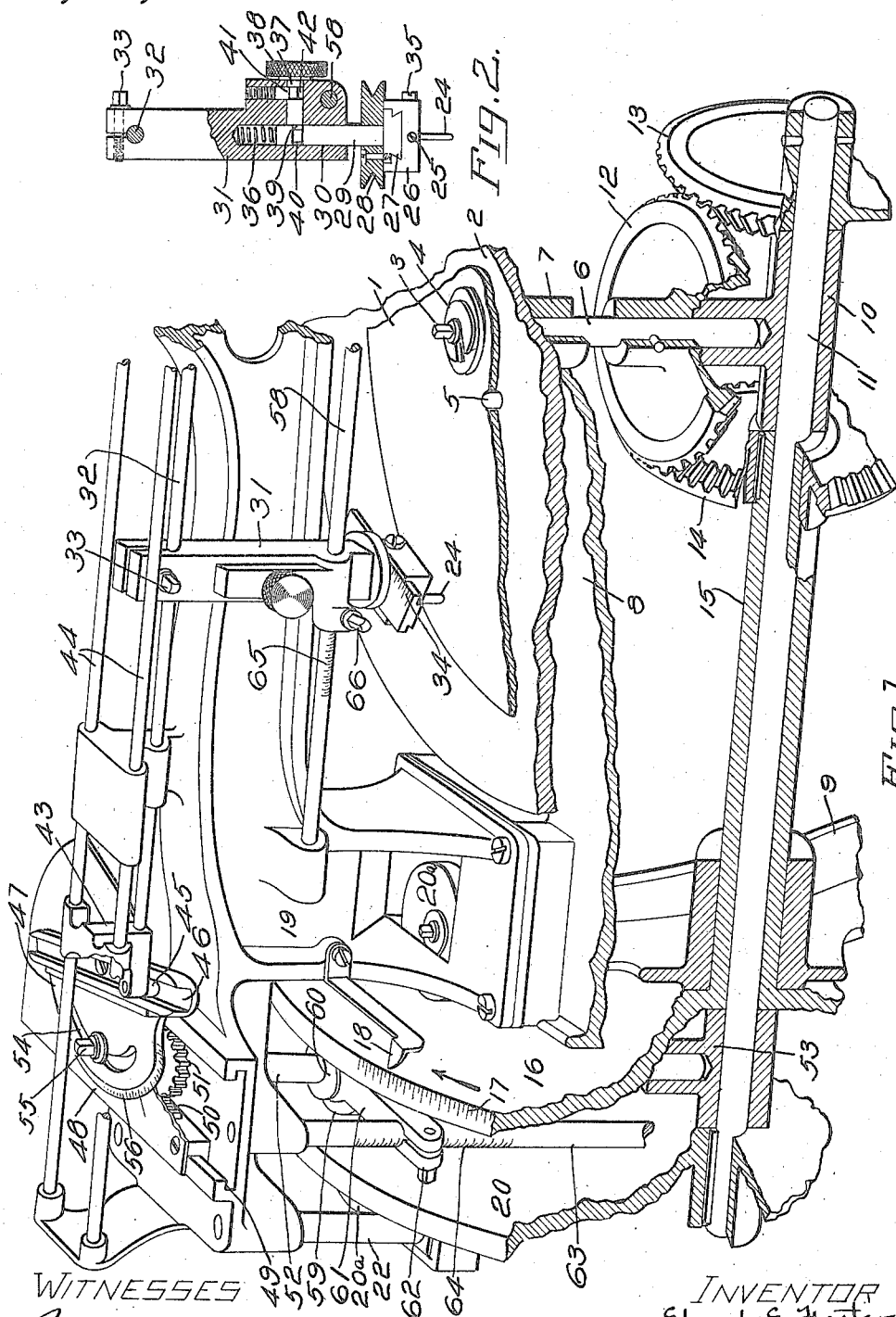

EDWARD E. FOSTER, OF BEVERLY, MASSACHUSETTS.

CAM-PATH-GENERATING MACHINE.

1,269,920.   Specification of Letters Patent.   Patented June 18, 1918.

Application filed October 24, 1913. Serial No. 797,081.

*To all whom it may concern:*

Be it known that I, EDWARD E. FOSTER, a citizen of the United States, residing at Beverly, in the county of Essex and State of Massachusetts, have invented a new and useful Improvement in Cam-Path-Generating Machines, of which the following is a specification.

As well known to those skilled in the art it is customary in the manufacture of cams to first generate the cam path upon paper and then scratch the outline of the generated cam path upon the leader. The leader is then cut down to the inner working surface of the path after which it is inserted in the cam cutting machine where it directs the operation of the cutting tool. As there are three principal kinds of motion imparted to a follower by a cam, namely, harmonic, uniform and gravity motions, to generate a cam path so that it will impart the proper motion to a follower including the proper sequence of rises, drops and dwells requires considerable knowledge, experience and skill upon the part of the designer, especially as these cam paths are continuous or closed and are usually provided with differential drops or rises, that is provided with sections having different rises. By a gravity motion cam path I mean a cam path that will impart to a follower a uniformly accelerated or uniformly retarded momentum corresponding to the uniformly accelerated or uniformly retarded momentum imparted by gravity to falling or ascending bodies, respectively. I have discovered that some of the well known mechanical devices are adapted to impart motions corresponding to the harmonic, uniform and gravity motions of a cam follower. For instance, a crank in rotating through 180 degrees imparts harmonic motion to a driven member, a swinging pendulum has a gravity motion and an inclined plane imparts to a driven member equal rises in equal intervals of time or uniform motion. Therefore, I have conceived the idea of utilizing mechanism in the generation of cam paths. I believe I am the first to have employed mechanism in the generation of uniform motion cam paths.

The object of the present invention is to produce a machine by which cam paths for imparting uniform motion to a follower may be accurately generated by an operative having little or no training in the design of cams.

To the accomplishment of this object and such others as may hereinafter appear the features of the invention relate to certain devices, combinations and arrangements of parts hereinafter described and then set forth broadly and in detail in the appended claims which possess advantages which will be apparent to those skilled in the art.

The various features of the present invention will be best understood from an inspection of the accompanying drawings illustrating one embodiment of the invention, in which, Figure 1 is a perspective, partly in section, of a machine for generating a cam path for imparting a uniform motion to a reciprocating follower; and Fig. 2 is a longitudinal sectional elevation of the tool frame and the parts carried thereby.

In the illustrated embodiment of the invention the cam path is generated directly upon the leader by a tool which is rotated to scribe a circle upon the leader having a diameter substantially equal to the diameter of the follower employed with the cam. The leader is rotated to transfer the point of operation of the tool around the leader and the tool is reciprocated radially of the leader during the rotation thereof to change the direction of the path scribed by the tool upon the leader. The tool is reciprocated by an inclined plane in the specific form of the invention selected for the purpose of illustration and consequently a cam path for imparting a uniform motion to the cam follower is generated, but it will be apparent to those skilled in the art that mechanism for reciprocating the tool with either a harmonic or a gravity motion may be substituted for the inclined plane and that the tool may be oscillated, that is, moved in an arcuate path, instead of reciprocated if it is desirable to generate a cam path for imparting motion to an oscillating follower. In order to adapt the machine for generating any desired cam path adjustments are provided for varying the operation of the tool in accordance with variations in the base circles, rises, drops, dwells and times in the different forms of cams to be designed. The leader 1, which may be either of zinc or of cast-iron having a thin deposit of copper upon its face, is clamped to the upper face of a disk 2 by a nut 3 and a washer 4, and is held from rotation on the disk 2 by a pair of pins 5 (only one of which is shown) projecting from the disk and arranged to engage a pair of holes formed in the leader. The disk 2 is secured to the upper end of a vertical shaft 6 journaled at one end in a boss 7, suitably formed in a table 8 carried by legs 9, and journaled at its other end in a step bearing formed in a sleeve 10 loosely mounted on a horizontal shaft 11 journaled in bearings depending from the table 8. The shaft 6 carries a bevel gear 12 which meshes with a gear 13 carried by the shaft 11 and also with a gear 14 carried by a sleeve 15 loosely mounted on the shaft 11. Secured to the sleeve 15 is a disk 16 which is provided with a scale 17 on its periphery coöperating with a pointer 18 secured to an overhanging bracket 19 carried by the table 8. This scale is graduated in degrees, and fractions thereof, from 0 to 360 and the gears 13 and 14 are proportioned to impart a complete rotation to the leader when the disk 16 is rotated to transfer the pointer 18 one complete revolution around the periphery of the disk. Splined to the shaft 11 is a second disk 20 which is held in position on the shaft by any preferred means mounted on the lower end of a vertical rod 22 carried by the bracket 19.

As shown in Fig. 1 the back faces of the disks 16 and 20 rotate in engagement with the rolls 20ª which hold the disks pressed toward each other.

In order to scratch a cam path upon the leader 1 the machine is provided with a scratching tool 24 which is held by a screw 25 in a block 26 carried by the carrier 27. The carrier 27 is secured to a sheave 28 carried by the lower end of a vertical shaft 29 which is rotatably mounted in a chamber 30 carried by a frame 31. The frame 31 is secured to a horizontal rod 32, mounted to reciprocate in the bracket 19, by a clamping bolt 33. The sheave 28 is driven from some suitable source of power so that the tool may be readily driven to scratch a circle upon the face of the leader. As the diameter of this circle is substantially equal to the width of the cam path or the diameter of the cam follower provision is made for adjusting the tool to scratch different sizes of circles in accordance with the different widths of the cam paths to be generated. To this end the block 26 may be adjusted in ways formed on the carrier 27 in a path transverse to the axis of rotation of the shaft 29 or may be actuated to scratch a circle having a diameter equal to the length of the carrier 27 when the tool is placed at one end of the carrier. To serve as a guide for the adjustment of the block 26 on the carrier 27 the carrier is provided with a scale 34. The adjusted position of the tool 24 on the carrier 27 is maintained by a clamping screw 35 arranged to bind the block 26 upon the ways of the carrier. The tool is pressed against the face of the leader by a spring 36 which is interposed between the top of the shaft 29 and the end of the chamber 30. In order to elevate the tool 24 against the tension of the spring 36 the frame 31 carries a horizontal shaft 37 one end of which is provided with a knurled knob 38 and the other end of which carries an eccentrically mounted pin 39 arranged to engage a groove 40 formed on the shaft 29. With this construction a turn of the knob 38 elevates the tool from the face of the leader. To hold the tool elevated the frame 31 carries a spring plunger 41 which engages a groove 42 formed in the shaft 37.

With the construction so far described a rotation of the leader will transfer the point of operation of the tool around the leader. In order to shift the point of operation of the tool during the rotation of the leader so as to change the direction of its path the rod 32 is connected to a block 43 mounted to slide on guides 44 carried by the bracket 19. The block 43 carries a roll 45 which engages a straight groove 46 formed in a plate 47. The plate 47 is secured to the upper face of a slide 48 mounted to slide in ways 49 formed in the bracket 19. The slide 48 carries a rack 50 which is engaged by a pinion 51 secured to the upper end of a vertical shaft 52 the upper end of which is journaled in a bearing carried by the bracket 19 and the lower end of which is journaled in a step bearing 53 carried by the shaft 11. With this construction a rotation of the shaft 52 reciprocates the slides 48 to transfer the roll 45 along the groove 46. If the groove is arranged parallel to the guides 49 no movement is imparted to the tool 24. Where the groove is arranged angularly to the guides 49 the tool is moved equal distances in equal intervals of time by an inclined plane thus imparting to the tool uniform motion. As it is desirable to vary the inclination of the inclined plane to vary the movement imparted to the tool the block 47 is provided with a segmental slot 54 which embraces a clamping bolt 55 that clamps the plate 47 to the slide 48. The plate 47 is provided with a scale 56 which coöperates with a mark formed on the slide 48 to serve as a guide to the operative to determine the proper angular position of the groove 46. To guide the tool 24 to reciprocate radially of the leader 1 the bracket 19 carries a horizontal rod 58 arranged in a vertical plane including the axis of the leader. The rod 58 loosely passes through the frame 31 so that the tool may reciprocate freely thereon and thus be constrained to move radially toward and from the axis of the leader.

In order to simultaneously rotate the leader and reciprocate the tool the shaft 52 carries a roll 59 the periphery of which engages the opposed faces of the disks 16 and 20. The roll 59 is slidably mounted upon the shaft 52 and may be adjusted thereon to position the roll between the axes of the disks and the peripheries thereof as desired to vary the speed of rotation of the shaft 52. To this end the roll 59 carries a ring 60 which rotates upon an arm 61 loosely embracing the shaft 52 and projecting from a clamp 62 which is mounted on a vertical rod 63 carried by the bracket 19. The rod 63 is provided with a scale 64 to serve as a guide for the adjustment of the roll along the shaft 52. With this construction when the operative rotates the disk 16 in the direction of the arrow (Fig. 1) the leader and tool are simultaneously rotated and reciprocated respectively.

In using the machine to generate a cam path intended to impart, for instance, a uniform rise of four inches in 90 degrees, a uniform drop of four inches in the next 45 degrees and a dwell during the remaining angle the frame 31 is adjusted upon the rod 58 so that the distance from the center of the shaft 29 to the axis of the leader 1 corresponds to the base circle of the cam path to be generated which as well known to those skilled in the art is a circle having its center at the center of the cam shaft and a radius equal to the shortest distance to the theoretical cam curve. The rod 58 is provided with a scale 65 to serve as a guide for the operative in adjusting the tool for the base circle. After this adjustment is made the frame 31 is temporarily held by a clamping bolt 66 which clamps the frame 31 to the rod 58. The bolt 33 is then loosened to free the rod 32 and the block 47 is then adjusted on the slide 48 so that the inclined plane will impart a four inch movement to the tool when the roll 45 is transferred from one end of the groove 46 to the other end. After this adjustment is made the frame 31 is unclamped from the rod 58 and again clamped to the rod 32.

Now it being desired to generate a cam path for imparting to a cam follower a uniform rise of four inches in 90 degrees (technically called "the time of the cam") the roll 59 is adjusted on the shaft 52 to such a point that when the disk 16 is rotated to transfer the pointer 18 from the 0 to the 90 mark on the scale 17 the roll 59 will rotate one half a revolution and thus reciprocate the slide 48 from its limit of movement in one direction to its limit of movement in the other direction. The parts being adjusted as described the operative rotates the disk 16 until the pointer 18 reaches the 90 mark on the scale 17. The leader rotates through 90 degrees and the rotating tool 24 is reciprocated four inches away from the axis of the leader thus generating upon the leader a cam path which will impart to a cam follower a uniform rise of four inches in 90 degrees. To obtain a uniform drop of four inches in the next 45 degrees the roll 59 is adjusted to the 45 degree mark on the rod 63 so that the roll 59 will again revolve one half a revolution as the pointer 18 travels from the 90 mark to the 135 mark on the scale 17. Then the disk is again rotated until the 135 mark is reached. During this movement of the disk 16 a cam path is generated on the leader which will impart a uniform drop of four inches in 45 degrees. To obtain a dwell during the remaining angle of 225 degrees the plate 47 may be adjusted on the slide 48 so that the groove 46 is parallel to the guides 49. It is preferred, however, to clamp the frame 31 to the rod 58 and unclamp it from the rod 32 as there is no danger of accidentally displacing the tool. After a complete cam path is generated the leader is cut down to the inner working surface of the cam path in readiness for its insertion into the cam cutting machine where it directs the operation of the cutting tool.

While the invention has been described as generating a specific cam path it will be readily apparent to those skilled in the art that the machine is adapted to generate any cam path for imparting to a reciprocating cam follower either a uniform motion or a dwell as the machine is provided with the necessary adjustments for varying the operation of the tool upon the leader in accordance with the variations in the base circles, rises, drops and times of the cam paths which it may be desired to generate.

While the invention has been illustrated and described in connection with a machine for generating a cam path for imparting uniform motion to a reciprocating follower it will also be understood that this is merely one embodiment of the invention which, of course, may have a variety of forms depending upon the kind of motion which it is desired to impart to the follower, the kind of cam to be provided with a cam path and whether the follower is offset or is mounted to oscillate or reciprocate. Neither is the specific construction and arrangement of parts shown and described essential, nor is the conjoint use of all the features of the invention essential, except so far as specified in the appended claims, and it may be varied or modified without departing from the broader features of the invention.

In the following claims the term "rises" for convenience has been used to denote "rises" or "drops" or both.

What is claimed as new, is:—

1. A cam path generating machine, having, in combination, a leader support, a tool, mechanism for relatively moving the leader support and the tool to transfer the point of operation of the tool around the leader, and means for varying the operation of said mechanism to generate a cam path having uniform motion sections, the sections having different rises.

2. A cam path generating machine, having, in combination, a leader support, a tool, mechanism for relatively moving the leader support and the tool to transfer the point of operation of the tool around the leader, and means for varying the operation of said mechanism to generate a cam path having uniform motion sections, the sections having different rises and different times.

3. A cam path generating machine, having in combination, a leader support, a tool, means for rotating the leader support to transfer the point of operation of the tool over the face of the leader, means for causing the tool to move toward and from the axis of the leader support with a uniform motion, and mechanism for varying the movement of the tool toward and from the axis of the leader support in accordance with variations in the base circles of the cam paths to be generated, substantially as described.

4. A cam path generating machine, having in combination, a leader support, a tool, means for rotating the leader support to transfer the point of operation of the tool over the face of the leader carried by the support, means for causing the tool to move toward and from the axis of the leader support with a uniform motion, and mechanism for varying the movement of the tool toward and from the axis of the leader support in accordance with variations in the rises of the cam paths to be generated, substantially as described.

5. A cam path generating machine, having, in combination, a leader support, a tool, means for rotating the leader support to transfer the point of operation of the tool over the face of the leader carried by the support, means for causing the tool to move toward and from the axis of the leader support with a uniform motion, and mechanism for varying the movement of the tool toward and from the axis of the leader support in accordance with variations in the times of the cam paths to be generated, substantially as described.

6. A cam path generating machine, having, in combination, a leader support, a tool, means for rotating the leader support to transfer the point of operation of the tool over the face of the leader carried by the support, means for causing the tool to move toward and from the axis of the leader support with a uniform motion, and mechanism for varying the movement of the tool toward and from the axis of the leader in accordance with variations in the base circles and rises of the cam paths to be generated, substantially as described.

7. A cam path generating machine, having, in combination, a leader support, a tool, means for rotating the leader support to transfer the point of operation of the tool over the face of the leader carried by the support, means for causing the tool to move toward and from the axis of the leader support with a uniform motion, and mechanism for varying the movement of the tool toward and from the axis of the leader support in accordance with variations in the base circles and times of the cam paths to be generated, substantially as described.

8. A cam path generating machine, having, in combination, a leader support, a tool, means for rotating the leader support to transfer the point of operation of the tool over the face of the leader carried by the support, means for causing the tool to move toward and from the axis of the leader support with a uniform motion, and mechanism for varying the movement of the tool toward and from the axis of the leader support in accordance with variations in the rises and times of the cam paths to be generated, substantially as described.

9. A cam path generating machine, having, in combination, a leader support, a tool, means for rotating the leader support to transfer the point of operation of the tool over the face of the leader carried by the support, means for causing the tool to move toward and from the axis of the leader support with a uniform motion, and mechanism for varying the movement of the tool toward and from the axis of the leader support in accordance with variations in the base circles, rises and times of the cam paths to be generated, substantially as described.

10. A cam path generating machine, having, in combination, a leader support, a tool, a guide therefor, means for rotating the leader support to transfer the point of operation of the tool around the leader carried by the support, and an inclined plane for reciprocating the tool on the guide during the rotation of the leader support to generate a continuous uniform motion cam path having differential rises therein.

11. A cam path generating machine, having, in combination, a rotatable leader support, a tool, a guide therefore intersecting the axis of the leader support, means for rotating the leader support to transfer the point of operation of the tool around the leader carried by the support and an inclined plane for reciprocating the tool on the guide during the rotation of the leader support to generate a continuous uniform motion cam path having differential rises therein.

12. A cam path generating machine, having, in combination, a leader support, a tool, a guide therefor, means for rotating the leader support to transfer the point of operation of the tool around the leader carried by the support, an inclined plane for reciprocating the tool on the guide during the rotation of the leader support to generate a cam path having uniform motion sections, the sections having different rises, and a single driver for operating the leader support and the inclined plane.

13. A cam path generating machine, having, in combination, a leader support, a tool, a guide therefor, an inclined plane for reciprocating the tool on its guide, and means for varying the inclination of the inclined plane to generate upon the leader carried by the support a continuous cam path having differential rises therein, substantially as described.

14. A cam path generating machine, having, in combination, a rotatable leader support, a tool, a guide therefor, an inclined plane for reciprocating the tool on its guide, a shaft and connections for reciprocating the inclined plane, and rotating the leader support, means for driving the shaft, and means for varying the speed of the shaft to generate upon the leader carried by the support a continuous cam path having differential rises and times therein, substantially as described.

15. A cam path generating machine, having, in combination, a leader support, a tool, an inclined plane for actuating the tool laterally of the leader carried by the support, and means for varying the inclination of the plane to generate a continuous cam path having differential rises therein, substantially as described.

16. A cam path generating machine, having, in combination, a leader support, a tool, and means for actuating the tool laterally of the leader carried by the support comprising a shaft, a pinion carried thereby, a rack engaged by the pinion, an inclined plane carried by the rack, and a connection between the inclined plane and the tool, substantially as described.

17. A cam path generating machine, having, in combination, a leader support, a tool, and means for actuating the tool laterally of the leader carried by the support comprising a shaft, a pinion carried thereby, a rack engaged by the pinion, an inclined plane carried by the rack, a connection between the inclined plane and the tool, and means for varying the inclination of the inclined plane, substantially as described.

EDWARD E. FOSTER.

Witnesses:
CHARLES E. GRUSH,
ELMER B. GRUSH.

Copies of this patent may be obtained for five cents each, by addressing the "Commissioner of Patents, Washington, D. C."